United States Patent [19]
Meinecke et al.

[11] 3,873,653
[45] Mar. 25, 1975

[54] PREPARATION OF HIGH FLUX CELLULOSE ACETATE MEMBRANES AND HOLLOW FIBERS FROM PREFABRICATED LOW FLUX SPECIMENS

[75] Inventors: Eberhard A. Meinecke, Akron, Ohio; Devendra V. Mehta, South Bend, Ind.

[73] Assignee: The United States of America as represented by the Secretary of the Interior, Washington, D.C.

[22] Filed: July 27, 1973

[21] Appl. No.: 383,233

[52] U.S. Cl. .................................. 264/41, 264/233
[51] Int. Cl. ............................................ B29d 27/04
[58] Field of Search ........ 264/41, 48, 233, DIG. 62

[56] References Cited
UNITED STATES PATENTS

| | | | |
|---|---|---|---|
| 3,432,584 | 3/1969 | Cannon et al. | 264/41 X |
| 3,494,780 | 2/1970 | Skiens | 264/41 X |
| 3,532,527 | 10/1970 | Skiens | 264/41 X |
| 3,699,038 | 10/1972 | Boom | 264/41 UX |

*Primary Examiner*—Lewis T. Jacobs
*Attorney, Agent, or Firm*—William S. Brown; Gersten Sadowsky

[57] ABSTRACT

A method for preparing high flux cellulose acetate membranes and hollow fibers from prefabricated low flux specimens. Low flux, hollow fiber, and planar are annealed in a selected plasticizing medium for a period of time at a temperature characteristic of the chemical nature of the polymer and the plasticizer. The temperature is that at which the plasticizer will begin to selectively solvate the polymer and is referred to as the temperature of incipient porosity.

3 Claims, 3 Drawing Figures

PREPARATION OF HIGH FLUX CELLULOSE ACETATE MEMBRANES AND HOLLOW FIBERS FROM PREFABRICATED LOW FLUX SPECIMENS

BACKGROUND

In the last decade, much research and development has taken place to uncover different methods and materials for the obtention of fresh or potable water from such sources as sea water, brackish subsoil water, or river water of 500 ppm or more of dissolved solids. The Federal Government has embarked on a massive research program to solve the problem of recovering fresh water economically from saline water such as sea water, brackish water, polluted streams, or sewage reclamation. Many methods for recovering fresh water from saline waters have evolved from such programs. Most methods of fresh water recovery from saline solutions involve the transfer of heat under thermodynamically irreversible conditions, so that the process as a whole has limited efficiency. In addition, in order to attain the high rate of heat flow neccessarily required, the saline solutions are normally handled at relatively high temperatures, which results in severe corrosion and scale problems. Also, the heat transfer approach normally requires a large number of stages in series to increase heat economy so that a large amount of equipment and much maintenance is required. Lately, the process of reverse osmosis has become a very significant and satisfactory method for recovering fresh water from saline water.

Osmosis is a naturally occurring phenomenon in which a semipermeable membrane separating solutions of different concentrations permits the passage of solvent from the dilute to the concentrated solution, but restrains the flow of solute. The flow of pure solvent can be stopped, however, if it is opposed by a force equal to the osmotic pressure. This pressure has a characteristic value depending on the particular solute and solvent, and the concentration of each, but independent of the nature of the semipermeable membrane. By applying a pressure greater than osmotic to the more concentrated solution, the flow of pure solvent can actually be reversed. Thus, if saline water at a pressure above osmotic is contacted with an appropriate semipermeable membrane, pure water may be recovered from the opposite side. This process is thus aptly referred to as reverse osmosis, and is particularly useful in separating solvents from solutions. Reverse osmosis has evoked considerable interest as an economical means for the desalination and purification of water.

The properties of the membrane are a major determinant in the cost of desalination by reverse osmosis. First, the membrane must demonstrate adequate selectivity, the ability to discriminate against solute while allowing solvent to pass through. This property is generally expressed in terms of the percentage salt rejection, defined as 100 times the difference between the concentration of solute in the feed and that in the permeate, divided by the concentration in the feed. Although the required selectivity depends on the concentration of the feed stream and the desired purity of the product, in general, to provide an economical process meeting commonly accepted potable water purity requirements (500 ppm or less dissolved solids) a semipermeable membrane should have a selectivity of about 90 to 95% for brackish water (usually about 3000–5000 ppm dissolved solids) and 99% or more for the purification of sea water (35,000 ppm dissolved solids). Secondly, it is important that the flow of water through the membrane be more than a mere trickle. The rate of flow of water through a unit area of membrane is commonly referred to as the flux. Thus, it can be readily seen that the higher the flux value, the more economical the process becomes.

The first membrane found capable of desalination was composed of cellulose acetate. This membrane, generally employed in the form of a uniplanar sheet, is described as a "dense" membrane because of its uniform porosity. No matter which side of the membrane faces the feed solution, its properties are the same. Although it is highly selective, its chief drawback is that its flux is low, making it uneconomical to build the hugh equipment necessary to desalinize appreciable quantities of water.

A continuing search has been conducted to prepare improved membranes, for example, by adding fillers to the membrane to increase its porosity or by making the membrane as thin as possible. Although improved permeability has been achieved, there is a sacrifice in the selectivity of these membranes. One of the most successful reverse osmosis desalination membranes has been prepared by a technique developed in the early 1960's by Loeb and Sourirajan. In this technique, a relatively concentrated solution of cellulose acetate is prepared in a mixture consisting of a solvent and appropriate swelling agents and/or nonsolvents. This solution is cast at a temperature of about 0° to 23°C to form a thin film which is then exposed to the air for approximately three to five minutes. During this period, solvent evaporates rather rapidly from the air exposed surface of the membrane as opposed to the slow removal of solvent from underlying portions bounded by the casting surface. Subsequently, the membrane is submerged in ice water for about one hour to complete the gelation of the membrane and a thin skin forms on the air exposed side of the membrane. Finally, the membrane is treated with hot water to tighten this skin. This process is described in U.S. Pat. Nos. 3,133,132 and 3,170,867.

The membranes prepared by the Loeb method are composed of two distinct layers—a thin dense semipermeable skin and a more porous nonselective support layer, both layers being of the same material, usually cellulose acetate. Because of these distinct layers and the difference in membrane properties observed, depending on which surface of the membrane faces the brine feed solution, this membrane has been described as "asymmetric."

While initially cellulose acetate membranes were prepared in the form of planar sheets, more recent studies have led to the preparation of such membranes in the form of hollow fibers. Such fibers have the advantage of increased treatment surface area over that of the planar membranes. Permselective hollow fibers may conventionally be melted, spun, or extruded as taught by McLain et al. in U.S. Pat. No. 3,423,491.

Although the asymmetric planar membranes and hollow fibers prepared by the above methods are the best membranes fabricated to date, they still suffer from a number of disadvantages. Despite the excellent salt rejection and water flux the membranes initially possess, they tend to demonstrate a rapid decline in the flux, probably caused by the compaction of the porous substructure under the high pressures used in reverse osmosis. In addition, the numerous steps used in preparation has made reproduction of the membranes difficult, and the preparation of large quantities of the membranes is a rather tedious matter.

Furthermore, asymmetric membranes prepared by the method of Loeb are water equilibrated, i.e., they must constantly be maintained in water. If the membranes are allowed to dry, their structure is destroyed and they cannot be restored to a condition suitable for use in reverse osmosis separations. This presents numerous problems in storing, handling, and installing the membranes and difficulties in shutting down a reverse osmosis desalination system without ruining the membranes. A further complication arises because these membranes are subject to biological attack by organisms in the water in which the membranes are stored.

In view of these problems, it is an object of our invention to prepare asymmetric reverse osmosis membranes which have excellent reverse osmosis properties, may be dry after prefabrication, and can be retreated and reused without major detriment to the membranes.

It is a further object of our invention to improve the economics of desalination by providing modified hollow fibers with increased flux and larger pores.

It is still a further object of our invention to provide a method for fabricating microporous hollow fibers useful in filtration devices for water renovation and waste treatment.

The modified membranes and hollow fibers of our invention possess a high flux to improve the economics of desalination by reverse osmosis. The membranes or hollow fibers with large pores can also be used for separation of solids from water (sewage treatment and fruit juice concentration) or as dialysis membranes with controlled porosity.

THE INVENTION

We have now discovered that high flux cellulose acetate membranes and hollow fibers can be prepared from prefabricated low flux specimens by treating such specimens in a plasticizer at a temperature whereat the plasticizer exhibits the characteristics of threshold solvation of the polymer, i.e., cellulose acetate. The low flux specimens are treated in the plasticizing media for a period of about thirty minutes. After such treatment, the specimen is immediately quenched in a water bath for about 15 minutes. The specimen is then transferred to a distilled water bath until its use is desired.

Figure 1:
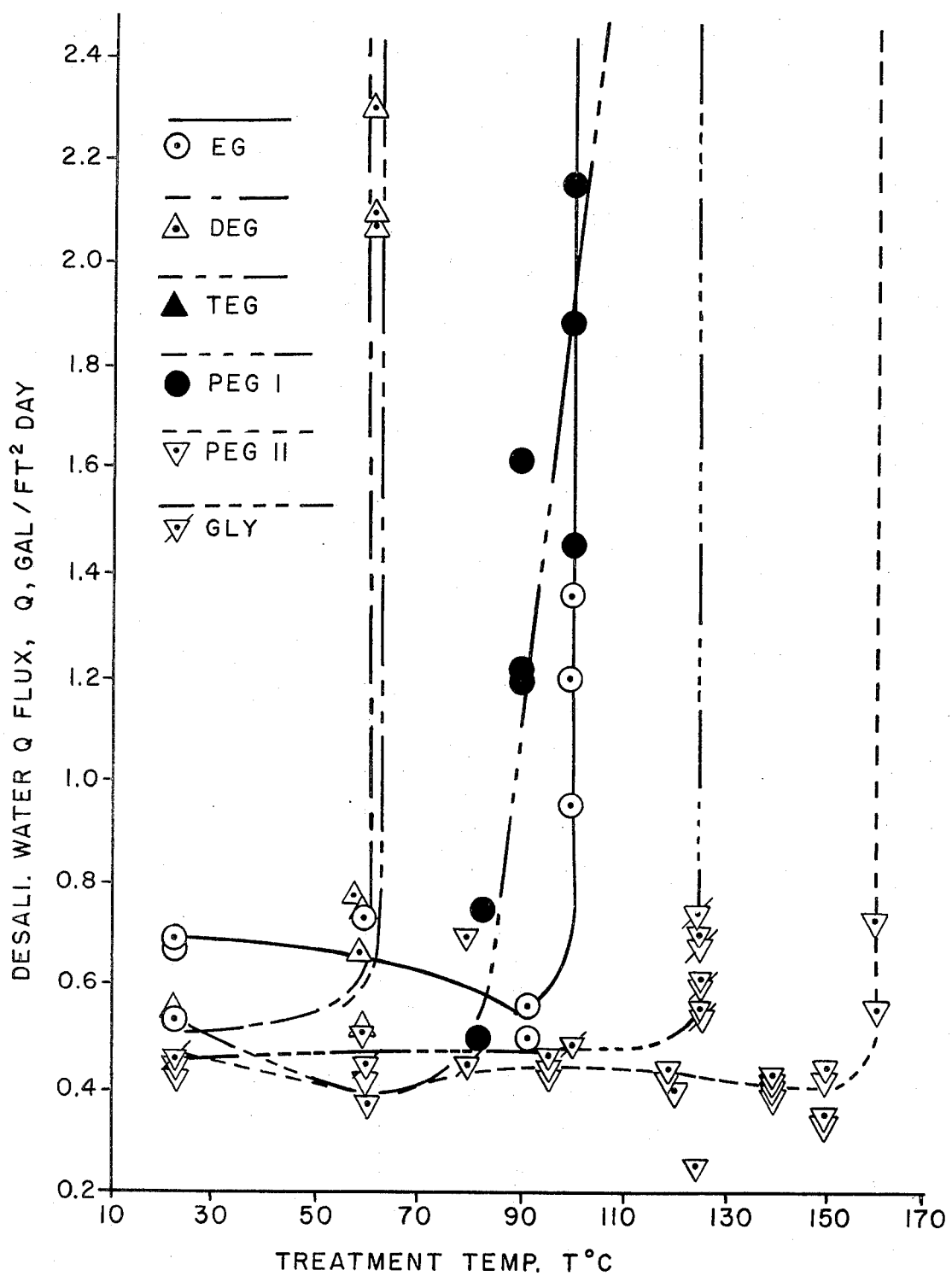
FIGS. 1 and 2 show the temperature of incipient porosity of various plasticizers employed in the formulation of cellulose acetate membranes, in accordance with Example 1 below.

Theory:

Our method by which prefabricated low flux cellulose acetate membranes (LFCAM) can be transformed into porous, high flux membranes resulted from studies of the annealing of prefabricated low flux cellulose acetate membranes in plasticizing medium, e.g., glycerine-water. Based on the findings from these studies, the following generalized theory was not only formulated, but its applicability was also verified. The basic underlying principle is established to be one involving the thermodynamics of polymer solutions.

When a polymer is exposed to an external heat plasticization treatment in a constant temperature plasticizer bath, there exists a certain treatment temperature, $T_t$, characteristic of the chemical nature of the polymer and the plasticizer, at which the plasticizer will begin to selectively solvate the polymer. Let this temperature be $T_p$, the temperature of incipient porosity. Further increase in the treatment temperature above $T_p$, will result in increased solvation of the polymer due to the increasing, temperature dependent, interactions between the polymer and the plasticizer. This increased solvation activity above $T_p$ will continue with increasing temperature, until the temperature of dissolution, $T_d$, is reached. At or about $T_d$, the polymer will dissolve in the plasticizer. The temperature of dissolution $T_d$, is the temperature at which the solubility parameter of the plasticizer equals that of the polymer. This constitutes a necessary condition for a true solution to occur.

The value of $T_p$, the temperature of incipient porosity, will depend on the chemical nature of the plasticizer used for the heat treatment, its molecular weight, and upon its interaction with the polymer.

Furthermore, $T_p$ can be regarded as the temperature at which the swelling characteristics of the plasticizer increases, i.e., $T_p$ constitutes the temperature at which the plasticizer exhibits the characteristics of threshold solvation of the polymer. At $T>T_p$, the solvation ability of the plasticizer with respect to the polymer will show a corresponding increase; and, as $T \rightarrow T_d$, the plasticizer becomes a true solvent for the polymer.

If one considers that the formation of any surface involves a balance between the inter- and intra-molecular (and atomic) forces of attraction and other related forces, a force balance will result in a surface exhibiting some degree of porosity. The relative degree of porosity will be controlled by the relative magnitudes of these balancing forces of attraction and repulsion. A polymeric surface, like any other surface, therefore, is a "porous" surface.

When such a "porous" polymeric surface is plasticized, it results in the swelling of the polymer. The swelling of the polymer continues until the swelling equilibrium, constituting an equilibrium between the polymer-plasticizer interactions, is reached. As the temperature of such a plasticizing treatment is increased, the temperature dependent polymer-plasticizer interactions increase until the threshold solvation temperature ($T_p$) is reached. At $T_p$, therefore, the polymer-plasticizer interations are so increased that the "pores" of the polymer matrix, filled up by the plasticizer, would constitute prime points of solvation. Commencement of such a selective attack will result in the widening of the "pores" due to the molecular and segmental rearrangement occurring from the increased polymer-plasticizer interactions, and also perhaps due to the heat expansion of the plasticizing liquid trapped inside such "pores." This widening of the matrix "pores" would increase, therefore, the porosity of the polymeric surface.

Reduction of Theory to Practice

The validity of this theory was verified by studying the desalination characteristics of prefabricated porous and nonporous low flux cellulose acetate membranes (LFCAM) and hollow fibers (LFCAHF). The porous specimens were obtained by external heat plasticization of the nonporous stock in various "plasticizing" media.

Planar LFCAM are generally cast from an acetonic solution of cellulose acetate while the LFCAHF are generally extruded. The planar membranes are then air dried and then transferred to a water bath to leach out the remaining solvent. The planar membranes or hollow fibers exhibit a very low flux.

According to the method of our invention, porous specimens are prepared from such prefabricated low flux specimens by annealing either the LFCAM or LFCAHF for about thirty minutes in a plasticizing media at a constant temperature characteristic of the polymer-plasticizer as noted earlier. Subsequently, the specimen is quenched in a room temperature water bath for about 15 minutes. The resulting membranes or hollow fibers are then stored in distilled water until they are ready to be used. The membranes resulting from such treatment exhibit an increased flux and salt rejection over the prefabricated specimens from which they originated.

The choice of plasticizer depends on two important factors. Firstly, the plasticizer must not be a true solvent for the polymer at room temperature ($\approx 23°C$). Secondly, it must be capable of selectively solvating the polymer (i.e. cellulose acetate) at a temperature equal to or greater than room temperature. Examples of some well suited plasticizers include ethylene glycol, diethylene glycol, triethylene glycol, polyethylene glycol, glycerine, and formamide.

The flux and salt rejection characteristics of the membranes is checked by conventional reverse osmosis desalination tests. The membrane porosity is determined by the $CuSO_4$-$K_4Fe(CN)_6$ test. The membrane test-piece is placed over a liquid film of one of the reagents, e.g. $CuSO_4$, and the other reagent, $K_4Fe(CN)_6$, is applied on the top surface of the test-piece. If the test-piece is porous, each of the two reagents penetrate through the membrane pores and upon coming in contact with the other, result in the formation of a brown precipitate of cupric ferrocyanide. The formation of such a precipitate is an excellent qualitative check for porosity, provided that the test membrane does not have any pin-holes. The same test is also performed on hollow fibers.

The following examples will serve to more fully illustrate the method of our invention:

EXAMPLE 1

Prefabricated planar LFCAM were cast from an acetonic solution of 25 weight percent cellulose acetate (Eastman, E398-3). The membranes were cast in a conventional manner at room temperature, on a polished plate glass surface, using a doctor's blade having a 15-mils clearance. The membranes were then air dried for one hour at ambient temperature (about 23°C). At the end of the drying period, each of the membranes (along with the glass plate) was transferred to a room temperature distilled water bath in order to leach out the last traces of the solvent (acetone) from the membrane. It was observed that upon placing the membrane inside the water bath, it usually peeled off from the glass plate within the first two minutes. A minimum water bath residence period of 30 minutes per membrane was always employed. The membranes were then dried between pads of filter paper in order to remove at least the surface moisture. The membrane thickness was measured on a thickness gauge. An average value of at least five readings per desalination test specimen was always used in flux calculations. The membranes were checked for pin-holes by the $CuSO_4$-$K_4Fe(CN)_6$ test.

EXAMPLE 2

Porous specimens were fabricated according to the following procedure in order to determine the temperature of incipient porosity of selected plasticizers.

Figure 2:
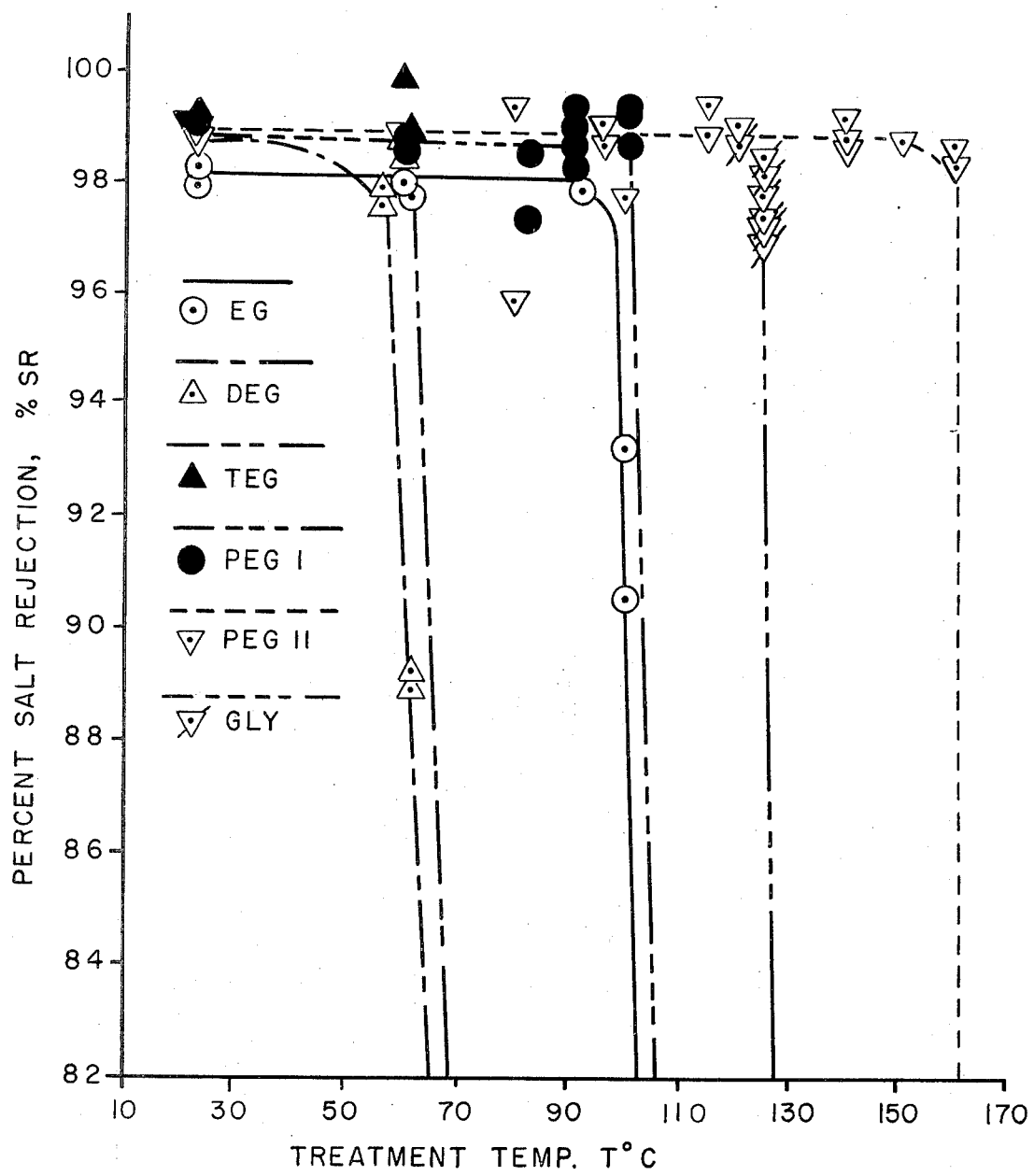

An 8 × 11 inch section of pin-hole free LFCAM produced in Example 1 was clamped to a clamping device so as to hold it in position during the entire annealing step. The clamped membrane was heat treated for 30 minutes in a constant temperature bath containing a specific plasticizer liquid, maintained at a specific treatment temperature, $T_t$, within ±0.1°C. At the end of the 30-minute treatment period, the clamping unit, with the clamped specimen, was immediately quenched in a room temperature water bath for a period of 15 minutes. The specimen was then removed from the clamping unit and was transferred to a room temperature distilled water bath, where it resided until further use. Each of the heat treated membranes were checked for pin-holes and porosity ($CuSO_4$-$K_4Fe(CN)_6$ test). Membranes exhibiting a negative $CuSO_4$-$K_4Fe(CN)_6$ test were employed in reverse osmosis desalination tests. This procedure was carried out at various temperatures for each plasticizer tested, in order to determine the temperature of incipient porosity of the particular plasticizer. The desalination characteristics—flux and percent salt rejection of heat treated cellulose acetate membranes—as a function of the treatment temperature $T_t$ are shown in FIGS. 1 and 2 respectively. The flux and salt rejection values per test are averages of at least two, and usually four, runs.

The desalination characteristics of the treated cellulose acetate membranes, free of pin-holes, were conducted at an applied pressure difference of 1500 psig, at 27°C, using a one percent by weight NaCl feed solution containing 0.02 grams of Biebrich Scarlet dye per liter of feed solution. The desalination test durations were in the range of 16–48 hours. The salt contents in the feed, prior to the addition of the dye, and in the desalinized product water were conductometrically determined by using a Beckman dip-cell.

As a result of these desalination tests of treated LFCAM and also those of LFCAHF, the temperature of incipient porosity of the various plasticizers employed was tabulated and the results are set forth in Table 1. Comparing the data of FIGS. 1 and 2 with the tabulations in Table 1, it can be seen that the temperature of incipient porosity, $T_p$, for each plasticizer, corresponds to the temperature at which the treated membrane exhibited complementary maximum flux and salt rejection values.

EXAMPLE 3

Low flux cellulose acetate hollow fibers (LFCAHF) were prepared by melt extruding cellulose acetate (Eastman, E400-25) at about 250°C in a laboratory extruder. The hollow fiber dimensions were about 14 mils O.D. and about 4 mils I.D. Bundles of LFCAHF were assembled from fiber sections about 7 inches long so that an average desalination area of about 0.135 ft.$^2$ was available. Each free end of the fiber bundle was potted in an epoxy plug. The design of one of the plugs permitted the hollow fibers to extend the plug so that the pure water could be collected from the interior of the fibers. The LFCAHF so prepared exhibited an average water flux of Q=0.009 gal/ft.$^2$ day, and a salt rejection of about 99 percent.

It should be noted that, while the LFCAHF which were used in gathering the data below were melt spun, other conventional methods such as wet spinning of polymer and solvent may be used to produce such specimens. However, the cost and involved procedures of such other methods make the method of melt extrusion the most feasible means for producing prefabricated LFCAHF. The treatment of prefabricated melt extruded hollow fibers is technologically simpler than to spin high flux fibers from solutions as our method does not impose any restrictions on the fiber diameter as in the case of solution extrusion of high flux fibers.

EXAMPLE 4

Figure 3:
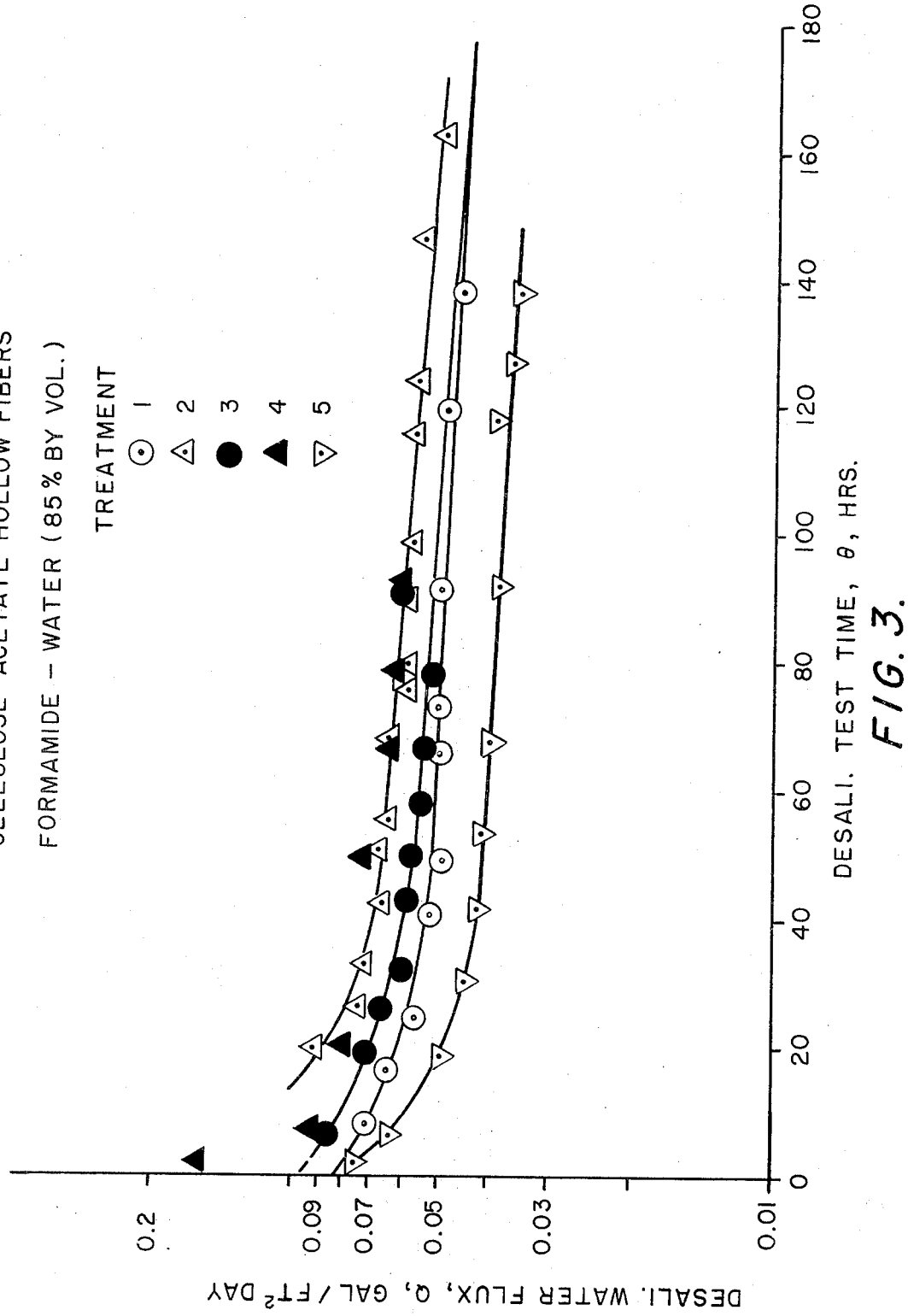
FIG. 3 shows the flux (Q) of hollow cellulose acetate fibers as a function of desalination test time, $\theta$, in accordance with Example 4 below.

The LFCAHF produced in Example 3 were treated in the same manner as were the LFCAM in Example 2. However, most of the data were obtained on LFCAHF treated at room temperature with formamide or a formamide-water mixture as a plasticizing media. Treatment time was 30 minutes followed by 15 minutes leaching time in distilled water. The flux (Q) of hollow fibers annealed in a formamide-water mixture at room temperature is shown in FIG. 3 as a function of desalination test time, $\theta$. The percent salt rejection varied from about 77 percent at $\theta=3$ hours to about 90 percent after $\theta=18$ hours. The salt rejection, after 18 hours remained constant at the high value of 90 percent.

Table 1 shows the porosity treatment conditions for low flux cellulose acetate membranes and low flux cellulose acetate hollow fibers as derived from the data collected by the procedures described in Examples 2 and 4.

Table 1

Porosity Treatment Conditions for LFCAM and LFCAHF

| Liquid | Abbreviations | Temperature of Porosity Tp, °C |
|---|---|---|
| Ethylene Glycol | EG | 99.0 |
| Diethylene Glycol | DEG | 57.2 |
| Triethylene Glycol | TEG | 60.5 |
| Polyethylene Glycol (M.wt.400) | PEG-I | 101.0 |
| Polyethylene Glycol (M.wt.600) | PEG-II | 161.0 |
| Gylcerine | Gly. | 161.0 |
| Formamide | FA | Room |

It is interesting to note that the porous hollow fibers show some 5 to 10 fold increase in the flow rate of pure water over the nonporous untreated hollow fibers. The corresponding drop in the salt rejection is only of the order of about 10 percent. Furthermore, the method of our invention for obtaining high flux porous hollow fibers offers the advantage of rejuvenation. As illustrated in FIG. 3, the flux of the porous hollow fibers which decay with time, can be restored to the original high value by merely repeating the original formamide treatment for 30 minutes followed by the short leaching period. In FIG. 3, the original hollow fiber bundle was retreated a total of five times.

We have found that planar membranes and hollow fibers treated in pure formamide at room temperature have yielded some very promising results. The treated specimens exhibited a 4 to 150 fold increase in the flux of desalinized product water over their nonporous, untreated counterparts. Desalination results obtained for the hollow fibers treated in formamide are set forth in Table II.

Table II

Desalination Characteristics of Nonporous and Porous Cellulose Acetate Hollow Fibers

| Bundle Number | Treatment | Test Time | Wall Thick $t_1$ (mils) | Actual Flux $Q_1$ (gf²d) | Normalized* Flux $Q_2$ (gf²d) | $Q_1 t_1$ gal.mil. ft² day | % SR | Number of Fold Increase in $Q_2$ |
|---|---|---|---|---|---|---|---|---|
| HU-15 | No | 5 days | 4.00 | 0.010 | 0.010 | 0.040 | 99.80 | 1 |
| HU-18$_1$ | Yes-I | ~18 hr | 4.33 | 0.040 | 0.043 | 0.173 | 91.30 | 4 |
| HU-18$_2$ | No | ~18 hr | 4.33 | 0.034 | 0.037 | 0.147 | 81.10 | 4 |
| HU-18$_3$ | Yes-I | ~18 hr | 4.33 | 0.031 | 0.034 | 0.134 | 79.20 | 3 |
| HT-25 | Yes-II | 0.667 hr | 4.17 | 0.366 | 0.382 | 1.526 | 75.50 | 38 |
| HT-24$_1$ | Yes-II | 0.80 hr | 4.13 | 0.440 | 0.454 | 1.817 | 43.0 | 45 |
| HT-24$_2$ | Yes-II | 1.01 hr | 4.13 | 0.321 | 0.331 | 1.326 | 37.0 | 33 |
| HT-21 | Yes-II | 2.16 hr | 4.21 | 0.073 | 0.077 | 0.307 | 27.4 | 8 |
| HT-33$_1$ | II | 13.8 min | 5.30 | 1.156 | 1.532 | 6.126 | 14.5 | 153 |
| HT-33$_2$ | | 25.2 min | 5.30 | 0.811 | 1.075 | 4.30 | 11.0 | 108 |
| Ht-33$_3$ | | 32.9 min | 5.30 | 0.634 | 0.840 | 3.36 | 12.4 | 84 |
| SHUT DOWN FOR ABOUT 45 HRS. | | | | | | | | |
| HT-33$_4$ | | 50.0 min. | 5.30 | 0.368 | 0.488 | 1.952 | 30.4 | 49 |
| SHUT DOWN FOR ABOUT 41 HRS. | | | | | | | | |
| REPEAT TREATMENT (with Formamide) ON THE TREATED BUNDLE - NO FRESH FA IN STOCK | | | | | | | | |
| HT-33$_5$ | | 100.0 min | 5.30 | 0.194 | 0.257 | 1.029 | 26.0 | 26 |

*Normalized to t = 4.0 mils.
Treatment I - Room temp. treatment in formamide-water (85:15% by vol.).
Treatment II - Room temp. treatment in pure formamide (FA).

Our invention as described herein may be embodied in other specific forms without departing from the spirit or essential characteristics thereof. The present embodiments are therefore to be considered in all respects as illustrative and not restrictive.

We claim:

1. A method for preparing a high flux cellulose acetate reverse osmosis membrane consisting essentially of:

a. Prefabricating a low flux specimen of said membrane;

b. treating said specimen by annealing for a period of about 30 minutes in a plasticizer from the group consisting of ethylene glycol, diethylene glycol, triethylene glycol, polyethylene glycol, glycerine, and formamide at the temperature of incipient porosity of said plasticizer; and c. quenching the specimen in water at room temperature for a period of about 15 minutes.

2. A method for preparing a planar high flux cellulose acetate reverse osmosis membrane consisting essentially of:
   a. Casting an acetonic solution of cellulose acetate to form a membrane of substantially uniform thickness;
   b. drying said membrane in air;
   c. immersing the cast membrane in water to leach out the acetone;
   d. drying the membrane to remove the surface moisture and wetness;
   e. annealing the membrane for about 30 minutes in a plasticizer from the group consisting of ethylene glycol, diethylene glycol, triethylene glycol, polyethylene glycol, glycerine, and formamide at the temperature of incipient porosity for said plasticizer; and
   f. quenching the membrane in a water bath at room temperature for a period of about 15 minutes.

3. A method for preparing a high flux hollow fiber cellulose acetate reverse osmosis membrane consisting essentially of:
   a. Forming a nonporous hollow fiber of cellulose acetate by melt extrusion;
   b. annealing the formed fiber for about 30 minutes in a plasticizer from the group consisting of ethylene glycol, diethylene glycol, triethylene glycol, polyethlene glycol, glycerine, and formamide at the temperature of incipient porosity for said plasticizer; and
   c. quenching the fiber in a water bath at room temperature for a period of about 15 minutes.

* * * * *